United States Patent
Pahl et al.

(10) Patent No.: US 7,520,988 B2
(45) Date of Patent: Apr. 21, 2009

(54) CROSS-FLOW FILTER CASSETTE

(75) Inventors: Ina Pahl, Hannover (DE); Hans-Weddo Schmidt, Hardegsen (DE); Ulrich Grummert, Bad Sooden Allendorf (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 374 days.

(21) Appl. No.: 11/602,884

(22) Filed: Nov. 20, 2006

(65) Prior Publication Data

US 2007/0062856 A1     Mar. 22, 2007

Related U.S. Application Data

(63) Continuation-in-part of application No. 10/168,806, filed as application No. PCT/EP00/13073 on Dec. 21, 2000, now abandoned.

(30) Foreign Application Priority Data

Jan. 5, 2000     (DE)     ................. 100 00 196

(51) Int. Cl.
*B01D 63/00* (2006.01)
*B01D 63/38* (2006.01)
*B01D 61/18* (2006.01)
*B01D 61/28* (2006.01)
*B01D 61/00* (2006.01)

(52) U.S. Cl. .............. 210/321.6; 210/321.64; 210/321.72; 210/321.75; 210/321.84; 210/486; 210/488; 422/101; 422/48

(58) Field of Classification Search ............. 210/321.6, 210/321.64, 321.72, 321.75, 321.84, 486, 210/488; 422/101, 48
See application file for complete search history.

(56) References Cited

U.S. PATENT DOCUMENTS

| | | |
|---|---|---|
| 4,715,955 A | 12/1987 | Friedman |
| 5,256,294 A | 10/1993 | van Reis |
| 6,099,730 A | 8/2000 | Ameer et al. |

FOREIGN PATENT DOCUMENTS

GB     2236693     4/1991

*Primary Examiner*—Krishnan S Menon
(74) *Attorney, Agent, or Firm*—Chernoff Vilhauer McClung & Stenzel, LLP

(57) ABSTRACT

An improved cross-flow filtration unit utilizing at least one two-ply membrane is disclosed that has a particular pore size relationship in the two membrane layers.

7 Claims, 1 Drawing Sheet

CROSS-FLOW FILTER CASSETTE

CROSS-REFERENCE TO RELATED APPLICATIONS

This is a continuation-in-part of U.S. application Ser. No. 10/168,806 filed Jun. 21, 2002, now abandoned the priority of which is claimed pursuant to 35 USC 120, and Ser. No. 10/168,806 is a Section 371 application of PCT/EP 00/13073 filed Dec. 21, 2000 that claims priority of DE 100 00 196.3 filed Jan. 5, 2000.

BACKGROUND OF THE INVENTION

In cross-flow filtration, a liquid feed flows tangentially over the surface of a filter material and is thereby split into a concentrate (retentate) stream and a filtrate (permeate) stream. Generally, microporous membranes are used which fall into the ultrafiltration and microfiltration classifications. Ultrafiltration membranes have average pores sizes that are capable of retaining macromolecules having a molecular weight between 500 and 1,000,000 Daltons, known in the filtration art as having a molecular weight cutoff (MWCO) of 500 to 1,000,000 Daltons. Microfiltration membranes exhibit average pore sizes of between 0.01 and 10 microns. See generally Chapter 4.3.3 in Gasper, *Handbook of Industrial Solids/Fluids Filtration* (1990).

Retentate flowing over the surface of the separation membrane is typically recycled to flow over the membrane's surface repeatedly. The permeate which penetrates the membrane generally perpendicular to its surface is removed from the back side of the membrane. The target substances can be in either the permeate and/or the retentate. Cross-flow filtration units are often used in the form of filter cassettes, as described, for example in U.S. Pat. No. 4,715,955 and in DE PS 34 41 249. Cassettes are comprised of a multiplicity of adjacent filter arrays, each array generally consisting of flat custom-cut sections of retentate spacers which form feed flow channels, a first single membrane layer, a spacer for the formation of a filtrate collection opening, and a second single membrane layer. Each feed flow channel is in fluid communication with a liquid feed inlet and with a retentate outlet, and each permeate channel is in fluid communication with a permeate outlet.

UK Patent Application 2,236,693 discloses a similar cross-flow filter, but with either self-supporting porous filter plates or porous polymeric membranes supported by and bonded to a porous ceramic layer having larger pores.

As the feed flows over the membrane surface, the retentate substance, because of its size, is blocked from passage through the pores of the membrane and is rinsed away from the membrane surface, so that it will not plug the membrane pores, thus preventing its permeation through the membrane. In spite of this, for various reasons, build-up of non-filtered residue is formed on the surface of the feed side of the membrane, which generally impairs the filtering capacity, the yield of targeted substances and the service life of the cross-flow filtration unit.

Thus a primary object of the invention is to provide an improved cross-flow filtration unit, which is characterized by an improved filtration capacity, a longer service life and a high product yield.

The foregoing and other objectives, features, and advantages of the invention will be more readily understood upon consideration of the following detailed description of the invention, taken in conjunction with the accompanying drawing.

BRIEF SUMMARY OF THE INVENTION

As used herein, the term "about" means the stated numerical value ±10% of that value.

The present invention provides an improved cross-flow filtration unit that separates
 the contents in a feed liquid;
 the permeate content in a permeate; and
 the retentate content in a retentate.

The essence of the invention comprises sizing the pores in the two layers of a two-ply microporous membrane such that the pores of the layer facing the feed channel of the cross-flow filtration unit are on average from about 1.4 to about 5 times the pores of the layer facing the permeate channel.

With the inventive cross-flow filtration units, fluids can be filtered which include liquids, emulsions, suspensions, potable fluids such as beer, beer flavorants, wine, juice, water, milk and whey; laboratory grade water; wastewater; fluids in the fields of pharmaceuticals, medicine, cosmetics, chemistry, biotechnology, gene technology, environmental protection and in laboratory work. The inventive cross-flow filtration units can be employed for recovery of valuable material, for separation of substances such as macromolecules and biomolecules, for depyrogenation and sterilization of solutions, for the separation of corrosive substances from fluids, for the filtration and concentration of biological solutions, for the separation of microorganisms such as bacteria, yeasts, virus and cell components and for the desalination of protein solutions and other biological media.

DETAILED DESCRIPTION OF PREFERRED EMBODIMENTS

Figure 1:
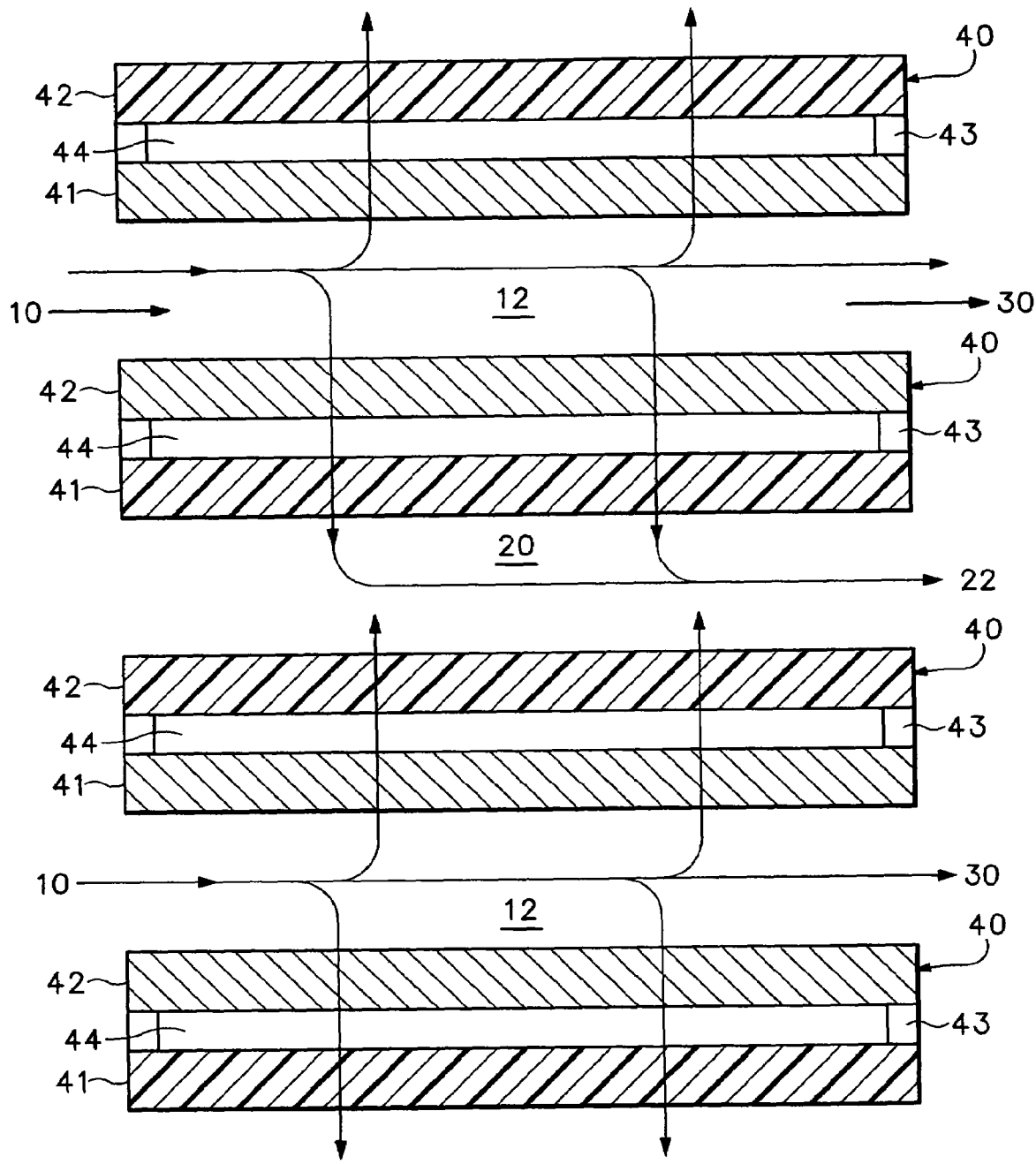
FIG. 1 is a schematic cross-sectional view of the operative parts of an exemplary cross-flow filtration unit of the present invention

The present invention comprises an improvement in cross-flow filtration unit that enhances its efficiency and extends its service life and provides greater yield of target substances.

Referring to FIG. 1, there is depicted in schematic form the operative parts of a cross-flow filtration unit of the invention, consisting of a series of liquid feed inlets 10, feed flow channels 12, permeate flow channels 20, permeate outlets 22, retentate outlets 30 and two-ply microporous polymeric membranes 40, each membrane consisting of a front side layer or ply 41 facing feed flow channel 12, and a back side layer or ply 42 facing permeate flow channel 20, with the two plys 41 and 42 being joined together by small spacers 43 in their peripheries. The two plys 41 and 42 physically lie one on top of the other, but are not bonded together in the area 44 between them. The feed and permeate collection channels are advantageously held open by spacers (not shown in FIG. 1) which are conventional.

The flow of fluid through the filtration unit is as depicted by the arrows in FIG. 1, with the liquid feed initially entering the unit through feed inlet 10, flowing through feed flow channel 12, where the stream is split into a retentate-containing fluid flowing out through retentate outlet 30 and a permeate-containing fluid that permeates membrane 40 substantially perpendicularly from its front side 41 to its back side 42 into permeate flow channel 20 and permeate flow outlet 22.

In the case of single ply or supported microporous membranes suitable for using in microfiltration and ultrafiltration wherein the pore sizes of the filtration membrane are in the range of a MWCO of 1000 Daltons to 1.2 microns there is often build-up on the feed side of the membrane. Rather surprisingly, it has been discovered that demonstrably greater permeate flow and greater yields are achieved when the filter material consists of two microporous polymeric membrane layers situated one on top of the other but slightly spaced apart and wherein the membrane layer 41 facing the feed flow channel 12 has an average pore size greater by a factor of from about 1.4 to about 5 than the average pore size of the membrane layer 42 facing the permeate flow channel 20. The slight spacing apart in the area 44 of the two polymeric membrane plys 41 and 42, which are inherently flexible, permits the two membrane plys to flex during filtration, which tends to retard blinding of the membrane layers and consequently accelerate filtration.

If the pore sizes of the membrane layers differ by a factor of less than about 1.4, then, from a commercial operation standpoint, either insignificant or no effects on filtration efficiency are observed. On the other hand if the pore sizes in the membrane layers differ by a factor of greater than about 5, then blinding of the membrane layer with the greater average pore size occurs very quickly, especially in the case of particulate-laden feed liquids, causing a halt to filtration.

In a preferred embodiment, the cross-flow filtration unit is constructed as a filter cassette, the membrane layers of which consist of microfiltration membranes. Particularly preferred is a filter cassette wherein the membrane layers facing the permeate collection channels have an average pore diameter in the range of 0.1 to 1.2 μm.

In an additional advantageous embodiment the filtration unit has a single two-ply membrane, a single feed inlet and channel, a single retentate outlet and a single permeate channel and outlet wherein the two layers of the microporous membrane are oriented as noted above, and the average pore sizes of the two layers comply with the above-noted restriction.

EXAMPLE 1

A cross-flow filtration cassette having a feed inlet and feed flow channel; a permeate flow channel and a permeate outlet; a retentate outlet; and 24 cellulose acetate two-ply microporous separation membranes was constructed wherein each two-ply membrane had a front side ply that faced the feed channel and a back side ply that faced the permeate channel. Each of said plies physically laid one on top of another and were joined at their peripheries by spacers, but not bonded together in the area between the spacers. The flow of liquid feed through the separation membranes was a cross-flow mode, i.e., tangential over the surface of each membrane and the flow of permeate through the membrane was from the front side ply to the back side ply, with recycle of the retentate. The filtration cassette was used to filter 127 mL of a yeast cell suspension (pichia) with a cell concentration of 6×10$^6$ yeast cells (retentate content) per mL, which contains a targeted protein having a molecular weight of 70,000 Daltons (permeate content). During filtration, the filtration cassette was operated at a constant transmembrane pressure of 0.55 bar (the transmembrane pressure is equal to [input pressure+outlet pressure]/2 minus permeate pressure). The pressure was at 0.9 bar at the feed inlet, 0.4 bar at the retentate outlet and 0.1 bar at the permeate outlet.

The cross-flow filtration filter cassette had a total membrane surface area of 0.4 m$^2$, with 13 feed flow channels and 12 permeate flow channels. The membrane layers facing the permeate flow channels had an average pore size of 0.2 μm, and the membrane layers facing the feed flow channels had an average pore size of 0.45 μm, or larger by a factor of 2.25. A volume of 7.3 L of the cell suspension was concentrated to a final volume of 1 L. The average permeate flow rate was 0.875 L/min·m$^2$. Filtration was conducted for 18 minutes. The concentration of the target protein in the permeate and the retentate was 107 and 238 mg/L, respectively. The yield of targeted protein was 72%.

COMPARATIVE EXAMPLE 1

Example 1 was repeated with the following exceptions: both plys of the two-ply membrane had an average pore size of 0.2 μm, so that the ratio of pore sizes was less than 1.4, i.e., 1; the average permeate flow rate was 0.29 L/min·m$^2$; filtration was conducted for 54 minutes; the concentration of the target protein in the permeate and in the retentate was 86 and 387 g/L, respectively; and the yield was 58%, or 14% less than with the filtration cassette of Example 1.

COMPARATIVE EXAMPLE 2

Example 1 was repeated with the following exceptions: the average pore size of the ply facing the feed flow channel was 1.2 μm, while that of the ply facing the permeate channel was 0.2 μm, so that the ratio of pore sizes was greater than 5, i.e., 6; the average permeate flow rate was 0.49 L/min·m$^2$; filtration was conducted for 37 minutes; the concentration of the target protein in the permeate and in the retentate was 89 and 365 g/L, respectively; and the yield was 61%, or 11% less than with the filtration cassette of Example 1.

EXAMPLE 2

A cross-flow filtration cassette of substantially the same design as the one in Example 1 was constructed with 20 two-ply membranes wherein the average pore size of the front side ply of each membrane was 0.65 μm while the average pore size of the back side ply for each membrane was 0.45 μm, so that the average pore size of the front side ply was 1.4 times the average pore size of the back side ply.

130 mL of a yeast cell suspension having a cell concentration of 107 yeast cells (retentate content) per mL containing BSA as the target protein (having a molecular weight of 66,000 Daltons (permeate content) was filtered through the cross-flow filtration cassette. Filtration took place in a cross-flow mode with recycle of the retentate. The transmembrane pressure was constant at 0.55 bar, while the pressure at the feed inlet was 0.9 bar, with 0.4 bar at the retentate outlet and 0.1 bar at the permeate outlet. 70 L of the cell suspension was concentrated to a final volume of 10 L over 140 minutes, meaning that the total throughput volume was 60 L. The average permeate flow rate was 0.952 L/min·m$^2$ and the final concentration of the target protein was 125 mg/L, with a target protein yield of 96%.

COMPARATIVE EXAMPLE 3

The same size cross-flow filtration cassette as in Example 2 was fabricated, except that both the front side ply and the back side ply of the two-ply membranes had an average pore size of 0.45 micron so that the average pore sizes in the two plies were equal. In other words, the average pore size of the front side ply was 1.0 times the average pore size of the back side ply.

Filtration of the same volume (total throughput 60 L) of a yeast cell suspension identical to that described in Example 2 was conducted in the same manner as described in Example 2 for 168 minutes. The average permeate flow rate was 0.793 L/min·m² and the final target protein concentration in the permeate was 120 mg/L, with a target protein yield of 92%. The average permeate flow rate for filtration with the cassette of Example 2 (pore size ratio of 1.4:1) was 0.952÷0.793×100, or 20% greater than the cassette of this Comparative Example 3 (pore size ratio 1.0:1), meaning that the filtration rate for the cassette of Example 2 was 20% faster than that for the cassette of this Comparative Example 3. In addition, even though filtration was conducted for 28 minutes longer with the cassette of this Comparative Example 3, the filtration did not achieve the same concentration of target protein in the permeate nor the same yield of target protein as was achieved by the cassette of Example 2.

EXAMPLE 3

A cross-flow filtration unit fabricated in the form of a filter cassette was employed with two-ply membranes exposed to the liquid feed and having a total membrane surface area of 0.4 m², and which had 13 feed flow channels and 12 permeate flow channels. The membrane layers facing the feed flow channels were of cellulose acetate, having an average pore size of 0.8 μm and the membrane layers facing the permeate flow channels were also from cellulose acetate, but having an average pore size of 0.2 μm, so that the ratio of pore sizes was 4.

Cross-flow filtration was carried out with the same amount of the same pichia yeast cell suspension of Example 1. The filtration took place in a cross-flow mode with recycle of the retentate and with the same pressure parameters as in Example 1.

A volume of 7.3 L of the cell suspension was concentrated to a final volume of 1 L. The average permeate flow rate was 0.810 L/min·m². Filtration was conducted for 19 minutes. The concentration of the target protein in the permeate was 102 mg/L. The yield of target protein was 69%.

EXAMPLE 4

The filtration results from all of Examples 1-3 and Comparative Examples 1-3 were plotted as a function of pore size ratio of the filtration membranes used. Specifically, both % yield of target protein data and permeate flow rate data were plotted against respective pore size ratios. The resulting graphs for a pore size ratio of 5.0 projected a 64% yield of the target protein with a permeate flow rate of 0.66 L/min·m². In other words, as compared to filtration with a pore size ratio of 6.0, the yield was slightly better, but with an unexpected 35% improvement in permeate flow rate.

A further advantage apparent from use of the inventive cross-flow filtration unit was that a single filtration simultaneously encompassed both pre-filtration and final filtration; by way of contrast, in conventional practice two filtration steps must be carried out to achieve pre- and final filtration. Thus, use of the cross-flow filtration unit of the invention clearly results in a reduction of the costs of filtration.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. A cross-flow filtration cassette having a feed inlet and feed flow channel; a permeate flow channel and a permeate outlet; a retentate outlet; and at least one two-ply microporous separation membrane having a front side ply facing said feed channel and a back side ply facing said permeate channel wherein said plies physically lie on top of one another and are joined at their peripheries by spacers but are not bonded together in the area between said spacers, wherein the flow of liquid feed through said separation membrane is tangential over the surface of said separation membrane and the flow of permeate through said separation membrane is from the front side ply to the back side ply, and wherein the pores of said separation membrane are sized such that the average pore size of said front side ply is from about 1.4 to about 5 times the average pore size of said back side ply.

2. The filtration cassette of claim 1 with a single two-ply separation membrane.

3. The filtration cassette of claim 1 containing a plurality of said two-ply separation membranes.

4. The filtration cassette of claim 3 containing at least one sequence of channels and two-ply membrane in the following order: feed channel, two-ply membrane, permeate channel, two-ply membrane.

5. The filtration cassette of any of claims 1-4 wherein the average pore size of said back side ply is such as to impart to said back side ply a molecular weight cutoff of at least 1000 Daltons.

6. The filtration cassette of claim 5 wherein the maximum average pore size of said back side ply is 1.2 microns.

7. The filtration cassette of any of claims 1-4 wherein the average pore size of said back side ply is from 0.2 to 1.2 microns.

* * * * *